(12) United States Patent
Silvy et al.

(10) Patent No.: US 7,923,615 B2
(45) Date of Patent: Apr. 12, 2011

(54) CATALYST SYSTEM FOR A MULTI-WALLED CARBON NANOTUBE PRODUCTION PROCESS

(75) Inventors: Ricardo Prada Silvy, Norman, OK (US); Christophe Pirlot, Petite-Chapelle (BE); Benedicte Culot, Jemeppe-sur-Sambre (BE)

(73) Assignee: Nanocyl S.A. (BE)

( * ) Notice: Subject to any disclaimer, the term of this patent is extended or adjusted under 35 U.S.C. 154(b) by 375 days.

(21) Appl. No.: 12/067,199

(22) PCT Filed: Aug. 25, 2006

(86) PCT No.: PCT/BE2006/000091
§ 371 (c)(1),
(2), (4) Date: Apr. 30, 2008

(87) PCT Pub. No.: WO2007/033438
PCT Pub. Date: Mar. 29, 2007

(65) Prior Publication Data
US 2008/0206125 A1  Aug. 28, 2008

Related U.S. Application Data

(60) Provisional application No. 60/718,925, filed on Sep. 20, 2005.

(30) Foreign Application Priority Data

Dec. 14, 2005  (EP) .................................... 05447280

(51) Int. Cl.
*C01C 1/00* (2006.01)
*C01G 49/00* (2006.01)
*C01G 51/04* (2006.01)
*B01J 23/00* (2006.01)
*B01J 20/00* (2006.01)
*B01J 21/00* (2006.01)

(52) U.S. Cl. ..................... 977/752; 977/842; 423/594.1; 423/594.5; 502/326; 502/327; 502/332; 502/336; 502/338; 502/355; 502/406; 502/415; 502/439

(58) Field of Classification Search .................. 502/326, 502/327, 332, 336, 338, 355, 406, 415, 439; 423/594.1, 594.5; 977/752, 842
See application file for complete search history.

(56) References Cited

U.S. PATENT DOCUMENTS 4,030,903 A * 6/1977 Rittler ............................ 65/32.4
(Continued)

FOREIGN PATENT DOCUMENTS
EP          1 674 154 A1    6/2006
(Continued)

OTHER PUBLICATIONS

Corrias et al., CVD from ethylene on cobalt ferrite catalysts: The effect of the support, CARBON, vol. 43, No. 13, Nov. 2005, 4 pages, pp. 2820-2823, ISSN: 0008-6223, XP005004235 (online available since Jul. 20, 2005).

(Continued)

*Primary Examiner* — Cam N Nguyen
(74) *Attorney, Agent, or Firm* — Reinhart Boerner Van Deuren P.C.

(57) ABSTRACT

The present invention relates to a catalyst system for the selective conversion of hydrocarbons into multi-walled carbon nanotubes and hydrogen comprising a compound of the formula: $(Ni,Co)Fe_yO_z(Al_2O_3)w$ wherein 'y' represents the molar fraction of Fe relative to Co and Ni and wherein $0.11 \leq y \leq 9.0$, $1.12 \leq z \leq 14.5$, and $1.5 \leq w \leq 64$.

30 Claims, 6 Drawing Sheets

Fe₃O₄

Fe₂O₃

Co Fe₂O₄

Co₃O₄

U.S. PATENT DOCUMENTS 4,198,467 A * 4/1980 Reade .......................... 428/410
4,916,105 A * 4/1990 Rieck et al. .................. 502/303
6,249,407 B1 * 6/2001 Aoshima et al. ........... 360/324.2

FOREIGN PATENT DOCUMENTS

WO     WO 03/004410 A1     1/2003

OTHER PUBLICATIONS

Reshetenko T V et al., Coprecipitated iron-containing catalysts (FE-Al2O3, Fe-Co-Al2O3, Fe-Ni-Al2O3) for methane decomposition at moderate temperatures- Part II. Evolution of the catalysts in reaction, Applied Catalysts A: General, Elsevier Science, Amsterdam, NL, vol. 270, No. 1-2, Aug. 30, 2004, pp. 87-99, 13 pages, XP004518321, ISSN: 0926-860X.

Ostotero J et al., Faraday rotation of pure and substituted cobalt ferrite single crystals, Journal of Magnetism and Magnetic Materials, vol. 104-107, 1992, pp. 425-426, 2 pages, XP002380439.

C. Misra, Aluminum Oxide (Hydrated), Kirk-Othmer Encyclopedia of Chemical Technology, [Online], vol. 2, 2003, pp. 421-433, 13 pages, XP002380440, Retrived from the Internet:URL:http://www.mrw.interscience.wiley.com/kirk/articles/hydrmisr.a01/pdf_fs.html>.

* cited by examiner

CoFe$_2$O$_4$(Al$_2$O$_3$)$_{32}$  t$_r$= 20 min       CoFe$_2$O$_4$(Al$_2$O$_3$)$_{32}$  t$_r$= 60

CATALYST SYSTEM FOR A MULTI-WALLED CARBON NANOTUBE PRODUCTION PROCESS

CROSS-REFERENCE TO RELATED PATENT APPLICATIONS

This patent application is the National Stage of International Application No. PCT/BE2006/000091, filed Aug. 25, 2006, that claims the benefit of European Application No. 05447280.8, filed Dec. 14, 2005, and claims the benefit of US Provisional Application No. 60/718,925, filed Sep. 20, 2005.

FIELD OF THE INVENTION

The present invention is related to a catalyst system for the conversion of hydrocarbons into carbon nanotubes and hydrogen, and in particular to a supported metallic mixed oxide catalyst system with improved selectivity for a multi-walled carbon nanotube production process.

STATE OF THE ART

Since the discovery of carbon nanotubes in the beginning of the 90's, intensive research has been conducted for use in different industrial applications. In fact, carbon nanostructures have shown exceptional mechanical, electrical, magnetic, optical and thermal properties that make them usable in many fields such as artificial muscle, biosensors, composite materials, conductive plastics, flat-panel display, microelectronic devices, extra strong fibres, electron field emission, gas storage, technical textile, protection against flame and antistatic, etc.

Various methods of synthesis have been developed for the production of carbon nanotubes with controlled properties including laser ablation, electrical arc discharge and catalytic carbon vapour deposition (CCVD) of hydrocarbons over metallic catalysts.

The CCVD method provides, with respect to other methods, the higher yields and quality of carbon nanotubes and simplifies the manufacturing process on an industrial scale. Most of the research carried out in the CCVD technology are presently focussed on developing new catalysts for controlling the type (single, double or multi-walled), diameter, length and purity of carbon nanotubes. The structural, physical and chemical properties of carbon nanotubes have been related to its electrical conducting capacity, mechanical strength and thermal, optical and magnetic properties.

Document WO-03/004410 discloses a large variety of metal oxides systems (such as Co, Fe, Ni, V, Mo and Cu) and catalyst supports (such as $Al(OH)_3$, $Ca(OH)_2$, $Mg(OH)_2$, $Ti(OH)_4$, $Ce(OH)_4$ and $La(OH)_3$), for the single-walled and multi-walled carbon nanotube production. The different metals and mixtures of metals in this document were tested on their selectivity properties, i.e. the ability of the catalyst to selectively produce single, double or multi-walled with respect to a certain proportion of amorphous carbon or fibres formed simultaneously during the reaction.

The selectivity properties of the different catalytic systems have been studied in the 400° C.-1100° C. temperature range, a hydrocarbon ($C_2H_2$, $C_2H_4$ or $CH_4$)/inert gas ($N_2$) flow ratio of about 0.1, hydrocarbon space time (W/F) of about 12.4 g.h/mol and a reaction time of 60 minutes. The reported carbon yields in this document varied between 200 wt % and 500 wt %, which means that one gram of catalyst produces between 2 and 5 grams of carbon.

However, carbon nanotube production on an industrial scale needs further optimisation in selectivity and productivity under relative moderated reaction temperatures and, in particular, a higher selectivity is needed to produce the desired carbon nanotubes without the formation of other types of carbon species (carbon fibres, amorphous carbon, etc). Furthermore, a higher carbon yield not only allows to optimise the carbon nanotube production per hour and per amount of catalyst but avoids many times its subsequent purification steps which have a detrimental impact on production costs.

SUMMARY OF THE INVENTION

The present invention discloses a catalyst system for the selective conversion of hydrocarbons into multi-walled carbon nanotubes and hydrogen comprising a compound of the formula:

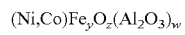
$(Ni,Co)Fe_yO_z(Al_2O_3)_w$ wherein "y" represents the molar fraction of Fe relative to Co and Ni and
wherein $0.11 \leq y \leq 9.0$,
$1.12 \leq z \leq 14.5$, and
$1.5 \leq w \leq 64$.

Particular embodiments of the present invention disclose at least one of the following features:
- preferably, the compound is $CoFe_yO_z(Al_2O_3)_w$ wherein
  $1.5 \leq y \leq 2.33$,
  $3.33 \leq z \leq 4.5$, and
  $3 \leq w \leq 32$;
- more preferably, the compound is $CoFe_2O_4(Al_2O_3)_w$ and
  $4.5 \leq w \leq 32$;
- most preferably, the compound is selected from the group consisting of $CoFe_2O_4(Al_2O_3)_{4.5}$, $CoFe_2O_4(Al_2O_3)_{16}$ and $CoFe_2O_4(Al_2O_3)_{32}$;
- in a privileged embodiment, the compound is $CoFe_2O_4(Al_2O_3)_{32}$;
- the compound is obtained by a thermal treatment of a hydroxide precursor of the formula (1)

$(Ni,Co)Fe_y(OH)_p(Al(OH)_3)_q$ wherein $1.5 \leq y \leq 2.33$,
$6.5 \leq p \leq 9.0$, and
$3 \leq q \leq 128$;
preferably, said hydroxide precursor is a hydroxide precursor of the formula:

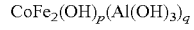
$CoFe_2(OH)_p(Al(OH)_3)_q$ wherein $7.0 \leq p \leq 8.5$ and
$6 \leq q \leq 96$;
more preferably, the hydroxide precursor is a hydroxide precursor of the formula:

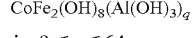
$CoFe_2(OH)_8(Al(OH)_3)_q$ wherein $9 \leq q \leq 64$;
most preferably, the hydroxide precursor is a hydroxide precursor of the formula:

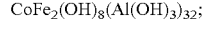
$CoFe_2(OH)_8(Al(OH)_3)_{32}$;

in a privileged embodiment the hydroxide precursor is a hydroxide precursor of the formula:

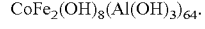
$CoFe_2(OH)_8(Al(OH)_3)_{64}$.

Additionally, the present invention discloses a process for synthesising the hydroxide precursor wherein a reaction between cobalt/nickel, iron and aluminium compounds is carried out according to a process selected from the group consisting of impregnation, co-precipitation, sol-gel and citrate complexation.

Additional embodiments of the synthesis of the precursor of the present invention comprises at least one of the following features:
- impregnation of an aluminium hydroxide with metallic solutions containing soluble salts of Co, Ni and Fe;
- the impregnation is a simultaneous impregnation;
- said aluminium hydroxide is selected from the group consisting of bayerite and gibbsite;
- preferably, the aluminium hydroxide is gibbsite;
- preferably, the gibbsite has a specific surface between 8 and 20 $m^2/g$;
- aluminium hydroxide is obtainable by a calcination of aluminium hydroxide at T$\geq$350° C. for 0.5 to 4 hours;
- the metallic solution containing soluble salts of Co, Ni and Fe comprises cobalt acetate or cobalt nitrate, nickel acetate or nickel nitrate, iron acetate or iron nitrate;
- the cobalt or nickel acetate is selected for (Co/Ni)/(Co/Ni)+Fe ratios between 0.30-0.40 and cobalt nitrate is selected for the Co/Co+Fe ratios between 0.30-0.75;
- the process for synthesising the hydroxide precursor catalyst comprises the step of co-precipitation of an aluminium hydroxide with metallic solutions containing soluble salts of Co, Ni and Fe;
- the aluminium hydroxide for the co-precipitation step is selected from the group consisting of bayerite and gibbsite;
- preferably, the aluminium hydroxide is gibbsite;
- the process for synthesising the hydroxide precursor catalyst comprises the additional step of drying the impregnated or co-precipitated mixed hydroxide at temperatures between 60° C.-120° C. for 1 to 4 hours;
- the process for synthesising the hydroxide precursor catalyst additionally comprises the step of calcinating the impregnated or co-precipitated mixed hydroxide at temperatures between 350° C. and 800° C. for 10 minutes to 1 hour;
- the calcination comprises two steps, a first step comprising heating in a flow of nitrogen at a temperature ranging from 120° C. to 350° C. at a rate of heat between 5° C. to 20° C. per minute and remaining isothermally at the same conditions between 0.5 to 4 hours, and a second step comprising a heating in a flow of nitrogen between 450° C. to 700° C. at a rate of heat between 5° C. to 20° C. per minute, and remaining isothermally between 0.5 to 2 hours;
- the first step comprises heating in a flow of nitrogen at a temperature ranging from 120° C. to 350° C. at a rate of heat between 5° C. to 20° C. per minute and remaining isothermally at the same conditions between 1 to 2 hours and the second step comprising a heating in a flow of nitrogen between 500° C. to 600° C. at a rate of heat between 5° C. to 20° C. per minute, and remaining isothermally between 0.5 to 2 hours;
- the catalyst support particle sizes as determined by XRD technique, when using the gibbsite variety of aluminium hydroxide, is between 30-70 nm;
- the catalyst support grain sizes, when using the bayerite variety of aluminium hydroxide, is between 20 μm to 70 μm.

Furthermore the present invention discloses a process for the selective conversion of hydrocarbons into multi-walled carbon nanotubes and hydrogen comprising the steps of:
- providing a catalyst precursor according to any of claims 5 to 8;
- activating the catalyst precursor by drying and/or calcination according to any of the claims 23 or 26;
- contacting the activated catalyst with a carbon source under multi-walled carbon nanotube production conditions defined by the reaction temperature and the reaction space time (W/F);
- extracting multi-walled nanotubes.

Additional embodiments of the synthesis of the precursor of the present invention comprise at least one of the following features:
- the carbon source is an olefin, an alkane or a mixture of them;
- the olefin is ethylene and/or propylene;
- the alkane is methane and/or ethane;
- the alkane mixture is natural gas;
- the reaction temperature is between 600° C. and 1100° C.;
- the reaction temperature is between 650° C. and 950° C.;
- the reaction space time (W/F) of the hydrocarbon is between 0.20 g.h/mole and 0.75 g.h/mole;
- the reaction space time (W/F) of the ethylene is comprised between 0.30 g.h/mole and 0.45 g.h/mole;
- the reaction space time (W/F) of the methane is between 0.20 g.h/mole and 0.45 g.h/mole;
- the selective conversion of hydrocarbons into multi-walled carbon nanotubes and hydrogen is performed according to a thin film catalysed bed process, a moving bed process or a rotary kiln process.

SHORT DESCRIPTION OF THE DRAWINGS

DETAILED DESCRIPTION OF THE INVENTION

Figure 1:
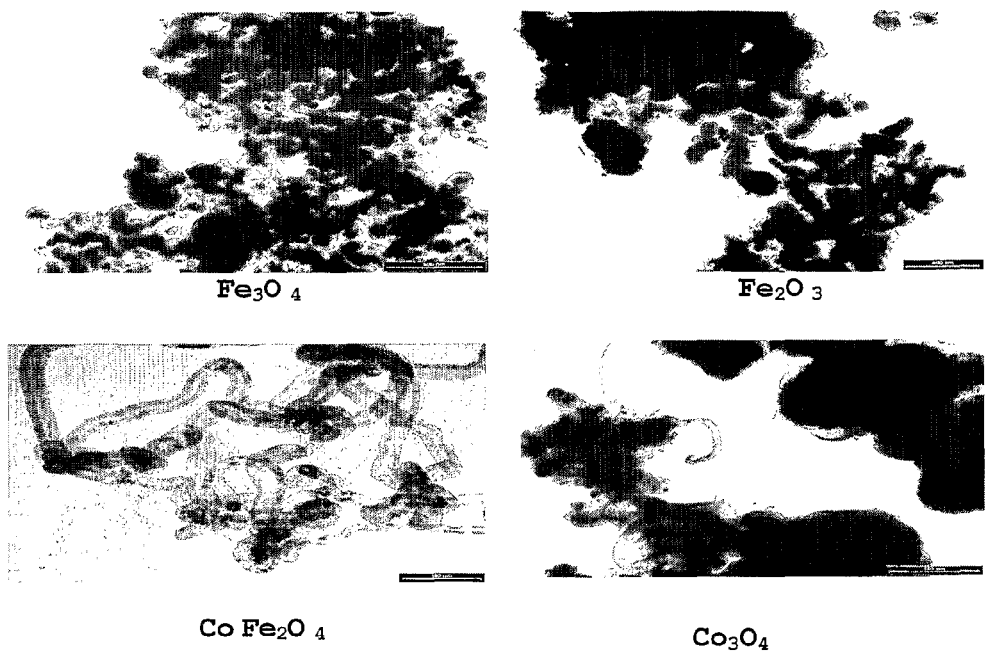
FIG. 1 represents the transmission electron microscopy (TEM) results corresponding to the carbon nanotubes synthesised by using different Co and Fe oxide model compounds.

Unless defined otherwise, all technical and scientific terms used herein have the same meaning as commonly understood to those skilled in the art in the field of catalysis.

The catalyst system disclosed in the present invention is based on a mixed oxide catalyst system containing iron, cobalt and/or nickel supported on aluminium oxide. This catalytic system produces in the presence of a carbon source under adequate operating conditions multi-walled nanotubes. The new mixed oxide catalyst system is provided along with his preparation process.

Non-restrictive examples of carbon sources are unsaturated or saturated hydrocarbons, such as acetylene, ethylene, methane or natural gas as well as cyclic hydrocarbons such as cyclohexane, cyclohexene, aromatic compounds, linear or branched hydrocarbons.

Compared to the multi-walled carbon nanotube yields with catalysts of the prior art and in particular of WO 03/004410, the process of the present invention provides for about a 31-times decreased space time, with higher hydrocarbon yields (3.7-times higher) and purity (of about 94% vs. 83%). This comparison is given in Table 1a. The hydrocarbon space-time (W/F) is defined as the weight of the catalyst in grams divided by the flow of reactant stream in mole/h at standard temperature and pressure conditions.

TABLE 1a

Comparison between the effectiveness of the prior art catalysts versus the present invention

| Catalyst | Space time (g · h/mole) | Reaction time (min) | Temp. (° C.) | Carbon yield (%) | Carbon purity (%) |
|---|---|---|---|---|---|
| Prior art WO-03/004410 | 12.4 | 60 | 700 | 510 | 83.6 |
| Present invention (20 min) | 0.40 | 20 | 700 | 1247 | 92.6 |
| Present invention (60 min) | 0.40 | 60 | 700 | 1894 | 95.0 |

Although the specific procedures and methods as described herein are mainly exemplified for the multi-walled carbon nanotube production from hydrocarbons, they are merely illustrative for the practice of the invention.

The process according to the present invention may be carried out as a vapour phase reaction. It is well understood that during the course of the process of the present invention, diluent inert gasses may be used such as He, $N_2$ and Ar and equally reducing or oxidising agents such as $H_2$ or $CO_2$ may be also added to the gas reaction.

The feedstock may be a single olefin or alkane, a mixture of alkanes, or mixture of olefins, or a mixture of alkane and olefins.

The hydrocarbon and a diluent gas concentration by volume of the feed supplied to the reactor in the present invention is within a range of 50-100 vol % in hydrocarbon and 0-50 vol % in diluent gas, preferably from 60 vol % to 90 vol % in hydrocarbon and from 10 vol % to 40 vol % in diluents.

As previously stated, the conversion process of hydrocarbons to carbon nanotube according to the present invention is carried out as a vapour phase reaction. Accordingly, any apparatus of the type suitable for carrying out CCVD reactions may be employed for the practice of the process. The process may be operated continuously or intermittently and may employ a thin film catalyst bed, moving bed or the so-called fluidised catalytic bed with finely divided particles. Table 1b shows the activity behaviour of the catalyst of the present invention obtained by different types of catalytic reactors. All tests show carbon yield and purity higher than 1000% and 90%, respectively. The better results were obtained using a moving bed catalytic reactor.

TABLE 1b

Activity results of the catalyst of the present invention obtained using different catalytic reactors

| Type of reactor | Process | Temperature/ reaction time/ % $C_2H_4$ in the feedstock | Carbon yield/ purity (%) |
|---|---|---|---|
| Fix bed | Discontinuous | 700° C., 20 min, 100% | 1247/92.6 |
| Moving bed | Continuous | 700° C., 20 min, 80% | 1550/93.4 |
| Thin film* | Discontinuous | 700° C., 20 min, 100% | 1040/90.5 |
| Thin film** | Discontinuous | 700° C., 20 min., 100% | 2915/96.7 |

*Co/Co + Fe = 0.5
**Co/Co + Fe = 0.33

The conversion process of hydrocarbons to carbon nanotube of the present invention is carried out at temperature in a range from 500° C. to 1100° C. and preferably in a range of from 650° C. to 950° C.

Pressures others than atmospheric may be employed in the process of the present invention; however, the process is usually conducted at or near atmospheric pressure, since the reaction proceeds well at such pressure.

The W/F values employed in the process of this invention may be selected from a broad operable range that may vary from 0.20 g.h/mole to about 0.80 g.h/mole. In the case of converting ethylene into carbon nanotube, a suitable space-time will be within a range from 0.30 g.h/mole to about 0.40 g.h/mole (Table 2). The optimum space-time will of course depend upon the hydrocarbon being reacted, the catalyst composition and the reaction temperature, but in general ranges between 0.20 g.h/mole and 0.45 g.h/mole.

TABLE 2

Carbon yield as a function of the ethylene space time

| | Space time (g · h/mole) | | | |
|---|---|---|---|---|
| | 0.30 | 0.40 | 0.55 | 0.75 |
| Mole of carbon per gram of catalyst | 1.025 | 1.039 | 0.923 | 0.745 |

DETAILED DESCRIPTION OF THE INVENTION

The present invention provides a catalyst with a metallic system comprising a metal selection on an available pool of appropriate metals including mixed metals. As such, by playing on a choice of appropriate metals, the nature, number and strength of the catalytic sites may be modulated. Therefore, one may modulate the catalyst's selectivity and the conversion rate of the starting product according to one's desired end product.

Determination of the Stoechiometric Structure of the Catalyst

In order to determine the stoechiometric structure of the nickel/cobalt-iron-aluminium oxide catalysts, chemical analysis and thermo-gravimetric measurements have been conducted on the different prepared samples (Table 3) on the basis of cobalt-iron-aluminium oxide catalysts.

TABLE 3

Chemical composition and thermo-gravimetric measurements corresponding to different cobalt-iron-aluminium oxide catalysts with two equivalent ways of representation

| Catalyst composition | % residue (thermo-gravimetric analysis) | % residue (theoretical) |
|---|---|---|
| $CoFe_2O_4(Al_2O_3)_{32}$ ($CoFe_{2.1}Al_{68.6}O_{106.9}$) | 13,960 | 13,953 |
| $CoFe_2O_4(Al_2O_3)_{10.5}$ ($CoFe_{2.0}Al_{21.1}O_{32.7}$) | 17,665 | 17,695 |
| $CoFe_2O_4(Al_2O_3)_{7.5}$ ($CoFe_2Al_{15.0}O_{23.4}$) | 17,332 | 17,358 |
| $CoFe_2O_4(Al_2O_3)_{4.5}$ ($CoFe_2Al_{9.0}O_{14.2}$) | 16,712 | 16,754 |
| $CoFe_2O_4(Al_2O_3)_{3.0}$ ($CoFe_2Al_{6.0}O_{9.5}$) | 16,177 | 16,231 |
| $CoFe_2O_4(Al_2O_3)_{1.5}$ $CoFe_2Al_3O_{4.9}$ | 15,308 | 15,384 |

For all samples, the cobalt, iron and aluminium content was determined by induced current plasma technique. The results in Table 3 are represented as a function of the Fe/Co and Al/Co atomic ratio. The oxygen content was obtained using the following equation:

Owt %=100%−Alwt %−Fewt %−Cowt %.

The O/Co atomic ratio is also represented for the different catalyst compositions.

The loss of weight after calcination of the samples at 700° C. was determined by thermo-gravimetric measurements. The theoretical residue was estimated taking into account the initial weight of $Al(OH)_3$, $Fe(NO_3)_3$ and $Co(AOC)_2$, used for the preparation of catalyst and assuming that these compounds are transformed into $CoFe_2O_4$ and $Al_2O_3$ after calcination at 700° C.

The relation between aluminium and oxygen atoms can be obtained by plotting O/Co vs Al/Co atomic ratio for the different samples. The straight line is obtained which correspond to the following relation:

O atom grams=1.5Al atom grams+4.0

The general equation obtained experimentally is the following:

$CoFe_2O_4(Al_2O_3)_w$

The experimental and theoretical residue values obtained are practically the same, which strongly suggest that a $CoFe_2O_4$-like phase supported on alumina is formed after calcination of the Co—Fe—Al precursor hydroxide catalysts.

In the present invention the conversion process of hydrocarbons to carbon nanotube involves a mixed oxide catalyst comprising aluminium and combinations of transition metals. The precursor of said mixed oxide catalyst comprises a hydroxide precursor of the formula (1)

$$Ni,Co)Fe_y(OH)_p(Al(OH)_3)_q \qquad (1)$$

wherein 1.5≦y≦2.33,
6.5≦p≦9.0, and
6≦q≦128.

Advantageously, the catalyst precursor responds to the following general formulation (2)

$$CoFe_2(OH)_8(Al(OH)_3)_{64} \qquad (2)$$

wherein q=64

A precursor hydroxide catalyst preparation process by mineral way involves a reaction between a salt of metal and an aluminium hydroxide. In the case of the present invention, the catalyst preparation process involves the reaction between cobalt or nickel compounds and an iron compound with an aluminium compound, followed by a drying step and a calcination step in order to obtain a mixed hydroxide compound that correspond to the above general formulation (2).

A reaction between cobalt/nickel, iron and aluminium compounds may be carried out by mineral way, comprising impregnation, co-precipitation, sol-gel and citrate complexation methods.

A reaction between cobalt, iron and aluminium compounds is suitably achieved by impregnation or co-precipitation, which may be carried out by contacting a cobalt/nickel salt, for instance cobalt/nickel acetate $(Co/Ni)(AOC)_2$ or cobalt nitrate $(Co/Ni)(NO_3)_2$, iron acetate $Fe(AOC)_3$ or iron nitrate $Fe(NO_3)_3$, with an aluminium hydroxide, for instance $Al(OH)_3$ or γ-AlOOH.

A suitable particle size distribution is such that the alumina hydroxide support particles have a size within a range from 5 microns to 70 microns. In this particle size range, the catalytic reaction is not limited by internal diffusion processes. The effect of grain sizes of a bayerite $(Al(OH)_3)$ used for the preparation of a Co—Fe supported catalyst on the activity properties is showed in Table 4.

TABLE 4

Effect of grain sizes of the alumina hydroxide support on the multi-walled carbon nanotube production

| | Particle size (μ) | | |
|---|---|---|---|
| | <20 | 20-70 | >70 |
| Mole of C/g. catalyst | 1.025 | 0.998 | 0.751 |

A reaction between Co/Ni, Fe and Al may also be carried out by organic sol-gel way. In this case, the reaction may involve an aluminium alkoxide, for instance aluminium tributoxyde; and a cobalt/nickel alkoxide as well as an iron alkoxide.

Using the complexation catalyst preparation method, the suitable Co/Ni, Fe and Al compounds may be metallic acetylacetonate salts $[C_{10}H_{19}Co^{+2}O_4$, $C_{15}H_{21}Fe^{+3}O_6$ and $C_{15}H_{21}Al^{+3}O_6]$ in an acid organic reaction environment such as citric acid.

Following a drying operation, the hydroxide is then calcinated to form an oxide precursor catalyst. Said drying operation may be carried out at temperatures from 30° C. to 150° C. Particular useful temperatures for said drying operation range from 60° C. to 120° C. using for example a conventional dryer, a ring dryer or a spray dryer equipment.

Calcination may be achieved in two steps. A first step typically comprises heating at a temperature ranging from 120° C. to 350° C. at a rate of heat between 5° C. to 20° C. per minute in a flow of nitrogen, remaining isothermally at the same conditions between 0.5 to 4 hours, preferably between 1 to 2 hours. A second step may comprise a heating between 450° C. to 700° C. at a rate of heat comprised between 5° C. to 20° C. per minute in a flow of nitrogen, preferably between 500° C. and 600° C., remaining isothermally between 0.5 to 2 hours. Calcination may be achieved in a conventional oven, rotary kiln or any of the type suitable for carrying out the calcination pre-treatment.

The calcination of the precursor hydroxide catalyst at temperatures between 300° C. and 700° C. produce structural modifications of Co, Fe and Al hydroxide phases. The aluminium hydroxide is decomposed in alumina ($\gamma$-$Al_2O_3$) and $H_2O$, while Co and Fe ions are transformed in indifferent oxidised phases such as $\alpha$-$Fe_2O_3$, $Fe_3O_4$, $CoFe_2O_4$, $Co_3O_4$, $CoAl_2O_4$, $FeAl_2O_4$. The nature and composition of these Co and Fe phase strongly depends on the Co/Fe atomic ratio composition, the nature of the catalyst support and the calcination temperature.

The loss of weight of the catalyst due to $H_2O$ molecules removal during calcination varies between 30 wt % and 40 wt %, and this range mainly depends on the type of alumina hydroxide used and the metal loading. The calcinated precursor oxide catalyst described in the present invention responds to the following general simplified formulae (3)

$$(Ni,Co)Fe_yO_z(Al_2O_3)_w \quad (3)$$

wherein "y" represents the number of Fe mole relative to Co and/or Ni mole and wherein $1.5 \leq y \leq 2.33$, $3.33 \leq z \leq 4.5$, and $4.5 \leq w \leq 48$.

Control of selectivity is one of the major roles governed by heterogeneous catalysts. Selectivity depends on the nature, surface dispersion and particle sizes distribution of Co and Fe phases as well as the textural, physico-chemical and acid-base properties of the catalyst support. In general, acid supports leads to the formation of amorphous carbon species (coke, graphitic carbon, etc) by cracking reaction mechanisms during the hydrocarbon decomposition at high temperature.

DESCRIPTION OF PREFERRED EMBODIMENTS OF THE INVENTION

The conversion process of hydrocarbons to carbon nanotube according to the present invention comprises the use of a $(Ni,Co)Fe_yO_z(Al_2O_3)_w$ catalyst which is characterised by a high performance and selectivity under reaction conditions.

The following non-restrictive examples are illustrative for preferred embodiments of the invention.

Catalysts were tested in the decomposition reaction of ethylene at 700° C., W/F=0.40 g.h/mole of ethylene, and reaction time of 20 minutes.

The carbon yield was determined experimentally from the following relationships:

carbon deposit(wt %)=$100(m_{tot}-m_{cat})/m_{cat}$ where $m_{tot}$ and $m_{cat}$ are the total weight of the product after reaction and the mass of catalyst before reaction, respectively.

Example 1

A series of CoFe/$Al_2O_3$ catalysts were prepared by co-impregnation of Al(OH)$_3$ support with Co(AOC)$_2$+Fe(NO$_3$)$_3$ solutions. The total metal loading (Co, Fe or a mixed Co+Fe) was 3.2 wt % for all samples.

In a first embodiment of the present invention a (NiCo) $Fe_yO_z(Al_2O_3)_w$ catalyst with a Co/Co+Fe composition between 0.2 and 0.8 including the outer limits, was prepared. A further embodiment relates to an optimal Co/Co+Fe ratio composition between 0.30 and 0.50 including the outer limits. The most efficient Co/Co+Fe composition ratio is between 0.30-0.40 (Table 5a).

TABLE 5a

Influence of the Co/Co + Fe composition in the catalyst on the carbon yield

| | Co/Co + Fe | | | | | | |
|---|---|---|---|---|---|---|---|
| | 0 | 0.25 | 0.33 | 0.40 | 0.50 | 0.75 | 1.0 |
| Carbon yield (%) | 191 | 924 | 1200 | 1156 | 982 | 610 | 333 |
| Carbon purity (%) | 65.6 | 90.2 | 92.3 | 92.0 | 90.8 | 85.9 | 76.9 |
| Thermal stability (° C.) | — | 514 | 520 | 518 | 516 | 488 | — |

In a second series of experiments, a $(Ni,Co)Fe_yO_z(Al_2O_3)_w$ catalyst with different Ni/Ni+Fe ratio compositions was prepared. In this case, nickel nitrate salt was used in the preparation of the samples. In Table 5b, one can observe that the optimal carbon yield and purity is obtained for Ni/Ni+Fe ratio composition between 0.25 and 0.33.

TABLE 5b

Influence of the Ni/Ni + Fe composition in the catalyst on the carbon yield

| | Ni/Ni + Fe | | | |
|---|---|---|---|---|
| | 0.25 | 0.33 | 0.50 | 0.75 |
| Carbon yield (%) | 975 | 928 | 663 | 108 |
| Carbon purity (%) | 90.7 | 90.3 | 86.9 | 51.9 |

Example 2

In this example, a cobalt nitrate salt was used instead of cobalt acetate for the preparation of the catalyst. The results of the multi-walled nanotube synthesis are shown in Table 5c. It is confirmed that an optimal carbon yield is obtained for a Co/Co+Fe composition in the catalyst of about 0.33. However, the carbon yield is higher than that observed for those catalysts prepared starting from Co(AOC)$_2$ salt and Co/Co+Fe ratio composition between 0.50 and 0.75.

TABLE 5c

Influence of the Co/Co + Fe composition in the catalyst on the carbon yield

| | Co/Co + Fe | | | | |
|---|---|---|---|---|---|
| | 0 | 0.25 | 0.33 | 0.50 | 0.75 |
| Carbon yield (%) | 191 | 703 | 1137 | 1081 | 1073 |

The catalytic behaviour observed when using different cobalt salts can be explained as follows: iron hydroxide species (Fe(OH)$_3$) precipitates at pH$\geq$2.5. The addition of Co(AOC)$_2$ to the iron solution increases the pH by $H_3O^+$ ions consumption, according to the following equation:

$CH_3COO^- + H_3O^+ <-> CH_3COOH + H_2O$

The impregnating solution becomes unstable for Co/Co+Fe ratio composition$\geq$0.50. A dark brown precipitate was formed, thus the activity of the catalysts was affected by the heterogeneous distribution of the metals. By contrast, by using cobalt nitrate instead of Co(AOC)$_2$, the impregnating solutions were clear and stables several days and for all Co/Co+Fe ratio compositions because the pH remained below 2.0.

Example 3

In another series of experiments, the catalysts were prepared with differing amounts of aluminium atoms and Co/Co+Fe ratio composition equal to 0.33. The latter correspond to $CoFe_2O_4(Al_2O_3)_w$, simplified formulae. The activity results of the catalyst series are shown in Table 6.

Two metal compositions in the catalyst deliver optimal catalytic activity. They are 9.5 wt % and 27.1 wt % of supported metals in the catalysts and correspond to $CoFe_2O_4(Al_2O_3)_{16}$ and $CoFe_2O_4(Al_2O_3)_{4.5}$ atomic ratios, respectively. The $CoFe_2O_4(Al_2O_3)_{4.5}$ was obtained by co-precipitation of Co, Fe and Al, thus $Al(OH)_3$ becomes soluble at very low solution pH (pH<1.5). In this case, $Al(OH)_3$ is used as co-precipitating agent. The $CoFe_2O_4(Al_2O_3)_{16}$ was prepared by impregnation of the $Al(OH)_3$ support from a $Co(AOC)_2$ and $Fe(NO_3)_3$ solution.

TABLE 6

Effect of the Al composition in the catalyst on the carbon yield

| Atomic ratio composition and compound between brackets | % of active phase in the catalyst (Co + Fe/Co + Fe + $Al_2O_3$) | Carbon yield (%) |
|---|---|---|
| $CoFe_2O_4(Al_2O_3)_{1.5}$ | 52.7 | 1382 |
| $CoFe_2O_4(Al_2O_3)_{3}$ | 35.8 | 1385 |
| $CoFe_2O_4(Al_2O_3)_{4.5}$ | 27.1 | 1432 |
| $CoFe_2O_4(Al_2O_3)_{6}$ | 21.8 | 1312 |
| $CoFe_2O_4(Al_2O_3)_{7.5}$ | 18.2 | 1238 |
| $CoFe_2O_4(Al_2O_3)_{9}$ | 15.7 | 1252 |
| $CoFe_2O_4(Al_2O_3)_{10.5}$ | 13.8 | 1191 |
| $CoFe_2O_4(Al_2O_3)_{16}$ | 9.5 | 1430 |
| $CoFe_2O_4(Al_2O_3)_{32}$ | 5.0 | 1200 |
| $CoFe_2O_4(Al_2O_3)_{64}$ | 2.5 | 430 |

Example 4

The effect of the order of addition of Co and Fe elements during the catalyst preparation was also investigated. Consecutive and simultaneous impregnation steps were carried out starting from $Co(AOC)_2$ and/or $Fe(NO_3)_3$ solutions.

Table 7 shows the carbon yield for the samples prepared by consecutive impregnation of metals (Co->Fe or Fe->Co) relative to the catalyst prepared by co-impregnation (Co+Fe). Consecutive impregnation Fe->Co provides equal performance than co-impregnation. However, the Co->Fe impregnation sequence produces catalysts with lower carbon nanotube yields. From the industrial standpoint, the co-impregnation is the desired technique of preparation of the catalyst of the present invention.

TABLE 7

Effect of the order of addition of Co and Fe solutions on the relative carbon yield

| | Impregnation sequence | |
|---|---|---|
| | Co -> Fe | Fe -> Co |
| Relative carbon yield | 0.754 | 0.987 |

Example 5

X-ray diffraction (XRD) and Mössbauer spectroscopy analysis conducted on different mechanical mixture of Co and Fe salts have evidenced the presence of $\alpha$-$Fe_2O_3$, $Fe_3O_4$, $Co_3O_4$ and $CoFe_2O_4$ phases after calcination at temperatures higher than 400° C. The relative proportion of these phases depends on the Co/Co+Fe composition. For instance, the Co and Fe phases observed at different Co/Co+Fe are summarised in Table 8.

TABLE 8

Co and Fe oxidic phases observed by XRD and Mössbauer spectroscopy techniques as a function of the Co/Co + Fe ratio composition

| | 0-0.1 | 0.1-0.4 | 0.4-0.8 | 0.8-1.0 |
|---|---|---|---|---|
| $\alpha$-$Fe_2O_3$ | X | X | X | X |
| $Fe_3O_4$ | | X | X | |
| $Co_3O_4$ | | | X | X |
| $CoFe_2O_4$ | | X | X | |

To understand the role of the Co/Co+Fe ratio on the catalytic properties of the catalysts, a number of tests were conducted using the above-mentioned cobalt and/or iron oxide model compounds. The activity results are presented in Table 9. It is observed that the $CoFe_2O_4$ mixed phase provide higher carbon yields than cobalt or iron oxides. Under the experimental reaction conditions, MW-CNT was only observed by transmission electron microscopy technique for $CoFe_2O_4$ and $Co_3O_4$ compounds. Using cobalt or iron oxides, amorphous carbon (such as metal carbide or oxide metallo carbide) were only observed.

TABLE 9

Co and Fe oxide phases observed by XRD and Mössbauer spectroscopy techniques as a function of the Co/Co + Fe ratio composition

| | Carbon yield (%) |
|---|---|
| $\alpha$-$Fe_2O_3$ | 93 |
| $Fe_3O_4$ | 132 |
| $Co_3O_4$ | 137 |
| $CoFe_2O_4$ | 474 |

Figure 2:
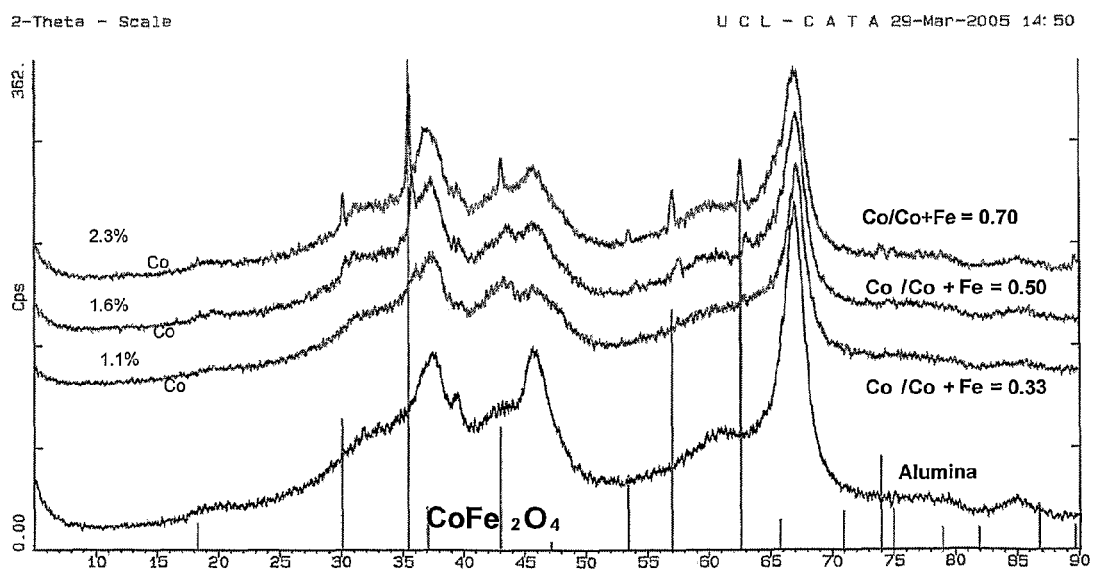
FIG. 2 represents the XRD patterns corresponding to the $(Ni,Co)Fe_yO_z(Al_2O_3)_w$ catalyst series prepared from different Co/Co+Fe ratio composition and constant $Al_2O_3$ composition (w=32).
Figure 3:
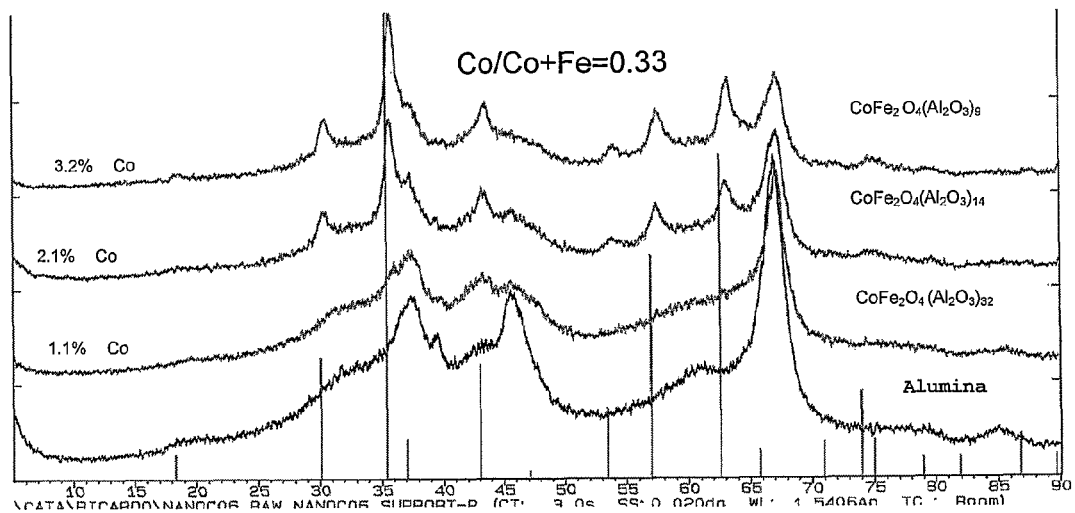
FIGS. 3 and 4 represent the XRD patterns corresponding to the $CoFe_2O_4(Al_2O_3)_w$ catalyst series prepared from different $Al_2O_3$ compositions and constant metal composition (Co/Co+Fe=0.33).
Figure 4:
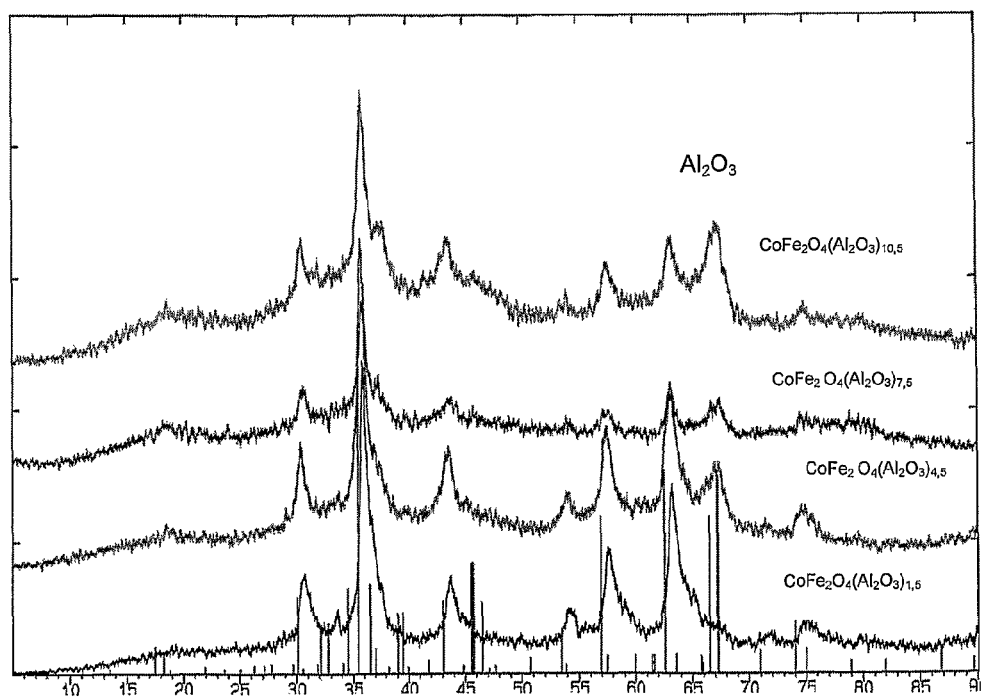

In order to verify the presence of the above Co and Fe oxide model compounds, in FIGS. 2, 3 and 4 is shown XRD diffraction patterns corresponding to the different $CoFe_2O_z(Al_2O_3)_w$ catalyst formulations. A $CoFe_2O_4$-like phase was identified for the Co/Co+Fe ratio composition between 0.30-0.75 (FIG. 2) and the peak intensities is higher for the Co/Co+Fe ratio composition=0.33 (FIG. 3). For the samples prepared with different aluminium content and Co/Co+Fe=0.33, the signals corresponding to the $CoFeO_4$-like phase are slightly shifted toward higher $2\Theta$ values. This suggests that an $CoFe_2Al_tO_n$ cluster is formed by a solid stated reaction during calcination at higher temperature.

To investigate the role of aluminium atoms in the $CoFe_2O_z(Al_2O_3)_w$ catalyst, we conducted experiments from mechanical mixer of $Co(AOC)_2+Fe(NO_3)_3$ and $Al(OH)_3$ in a ball-mill for 30 minutes followed by a drying (120° C., 30 minutes) and calcination (700° C., 15 minutes) steps. The activity of the different prepared samples is shown in Table 10. It is concluded from the obtained results that both the Co/Co+Fe ratio composition and the presence of $Al(OH)_3$ play an important role on the performance of the carbon nanotube production catalyst. The results of Table 10 also indicate that the co-impregnation is the best method for preparing the $CoFe_2Al_tO_n$ carbon nanotube production catalyst.

TABLE 10

Activity of the catalysts prepared by different methods

| Catalyst preparation procedure | Catalyst preparation method | Co/Co + Fe | Carbon yield (%) |
|---|---|---|---|
| $Co(AOC)_2 + Fe(NO_3)_3$ | Mechanical mixture | 0.33 | 311 |
| $Co(AOC)_2 + Fe(NO_3)_3 + Al(OH)_3$ | Mechanical mixture | 0.50 | 894 |
| $Co(AOC)_2 + Fe(NO_3)_3 + Al(OH)_3$ | Mechanical mixture | 0.33 | 932 |
| $Co(AOC)_2 + Fe(NO_3)_3 + Al(OH)_3$ | Impregnation | 0.33 | 1200 |

Example 6

The effect of the type of aluminium hydroxide support on the catalytic properties of the $CoFe_2O_4(Al_2O_3)_{32}$ catalyst is shown in Table 11. Theses aluminium compounds form different crystallographic structures and they show differences in surface area and acid-base properties.

TABLE 11

Effect of the nature of catalyst support on the carbon yield

| Type of support | gibbsite 1 | gibbsite 2 | gibbsite 3 | bayerite (20-60 μm) | alumina γ-$Al_2O_3$ |
|---|---|---|---|---|---|
| pH in solution (after 24 h) | 7.8 | 7.9 | 8.1 | 9.0 | 7.5 |
| Surface area m²/g | 186 | 193 | 238 | 198 | 250 |
| Carbon yield (%) | 140 | 177 | 1200 | 1130 | 283 |
| VP (cc/g) | 0.25 | 0.26 | 0.28 | 0.25 | 0.71 |
| Average diameter of pore (A°) | 39 | 39 | 37 | 38 | 74 |
| particle size (nm) as determined by XRD | >150 | >150 | 48 | 120 | — |

The results of Table 11 clearly show that Al(OH)3 provides more effective catalysts than AlOOH and γ-Al2O3 supports in the carbon nanotube production. The basic character of the Al(OH)3 support enhances the carbon yield. Gibbsite and bayerite are suitable Al(OH)3 supports or precipitating agents for the preparation of the CoFe2Oz(Al2O3)w catalysts of the present invention. Smaller particle sizes of the $Al(OH)_3$ support provide higher BET surface area, therefore Co and Fe surface metal dispersion and CNT's yield.

Example 7

Carbon nanotube diameter is influenced by different parameters such as the reaction temperature, the reaction time and the metallic particle size. Table 12 shows the variation of MWNT carbon nanotube diameter, as determined by transmission electron microscopy technique, as a function of the time of reaction for two catalyst formulations. The results clearly show that the carbon nanotube diameter progressively increases as a function of the reaction time.

Figure 5:
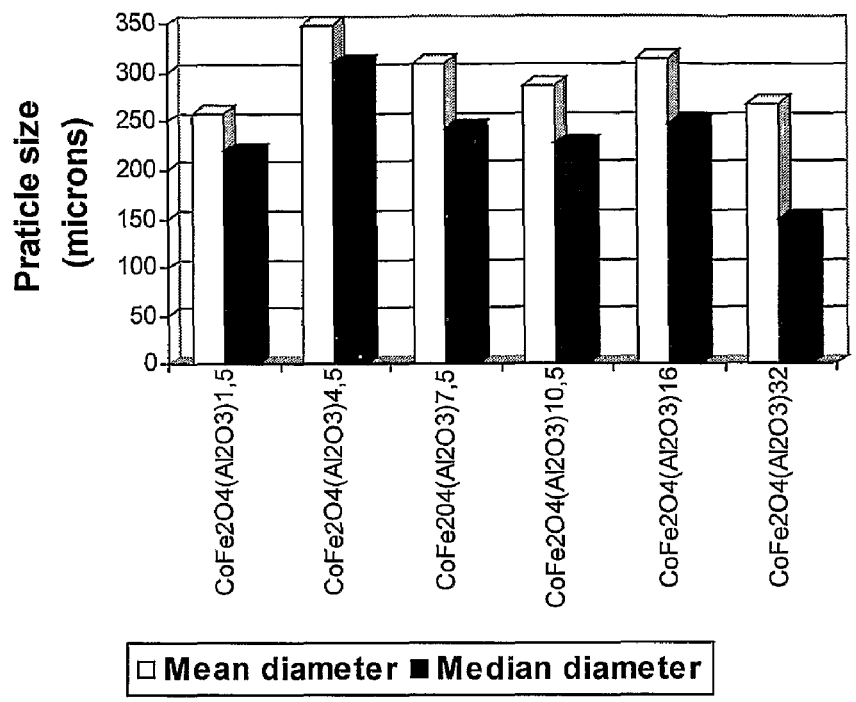
FIG. 5 represents the particle size distribution corresponding to different $CoFe_2O_4(Al_2O_3)_w$ formulations.

FIG. 5 shows the variation of catalyst particle sizes distribution, determined by light scattering technique, for different $CoFe_2O_4(Al_2O_3)_w$ compositions. As expected, the particle sizes increase when the Co and Fe composition in the catalyst increases, therefore higher carbon nanotube diameters are obtained.

TABLE 12

Variation of the multi-walled carbon nanotube diameter as a function of the reaction time and the catalyst $CoFe_2O_4(Al_2O_3)_w$ composition

| | Reaction time (min.) | | | |
|---|---|---|---|---|
| | 10 | 20 | 30 | 60 |
| $CoFe_2O_4(Al_2O_3)_{4.5}$ | 13.0 nm | 13.5 nm | 14.7 nm | 14.9 nm |
| $CoFe_2O_4(Al_2O_3)_{32}$ | 8.5 nm | 10.6 nm | 10.8 nm | 12.3 nm |

Figure 6:
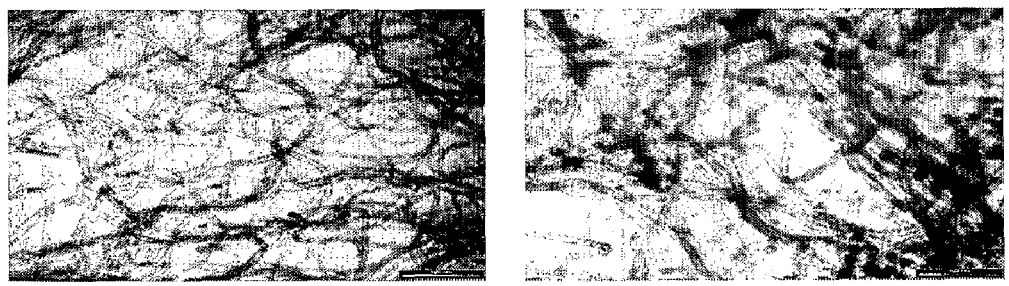
FIG. 6 represents the transmission electron microscopy images of the multi-walled carbon nanotube synthesised at 20 minutes and 60 minutes on $CoFe_2O_4(Al_2O_3)_{32}$ catalyst.
Figure 7:
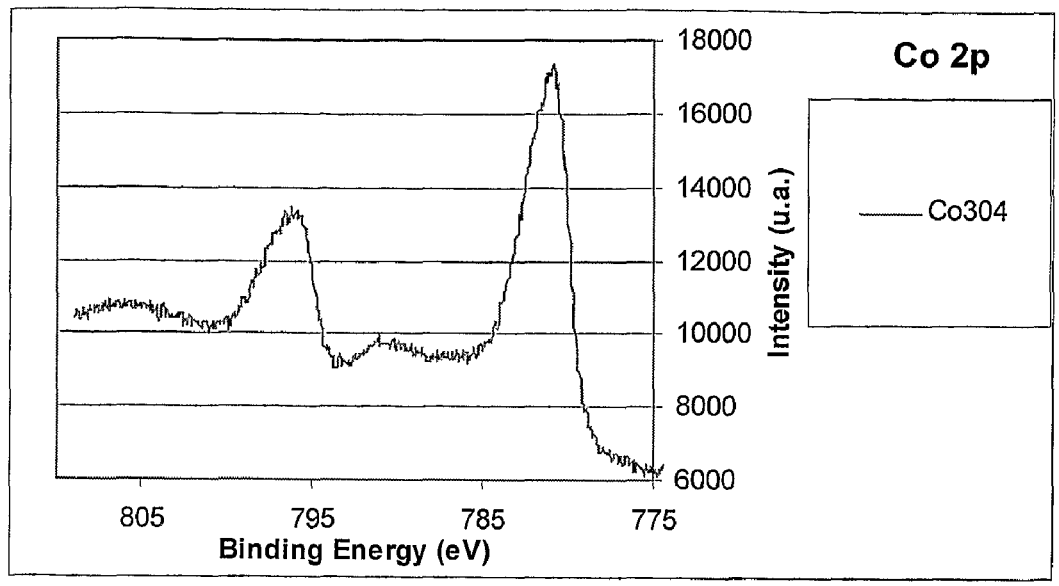
FIG. 7 represents the X-ray photoelectron spectroscopy (XPS) results corresponding to the Co2P energy level of $CO_3O_4$ model compound.
Figure 8:
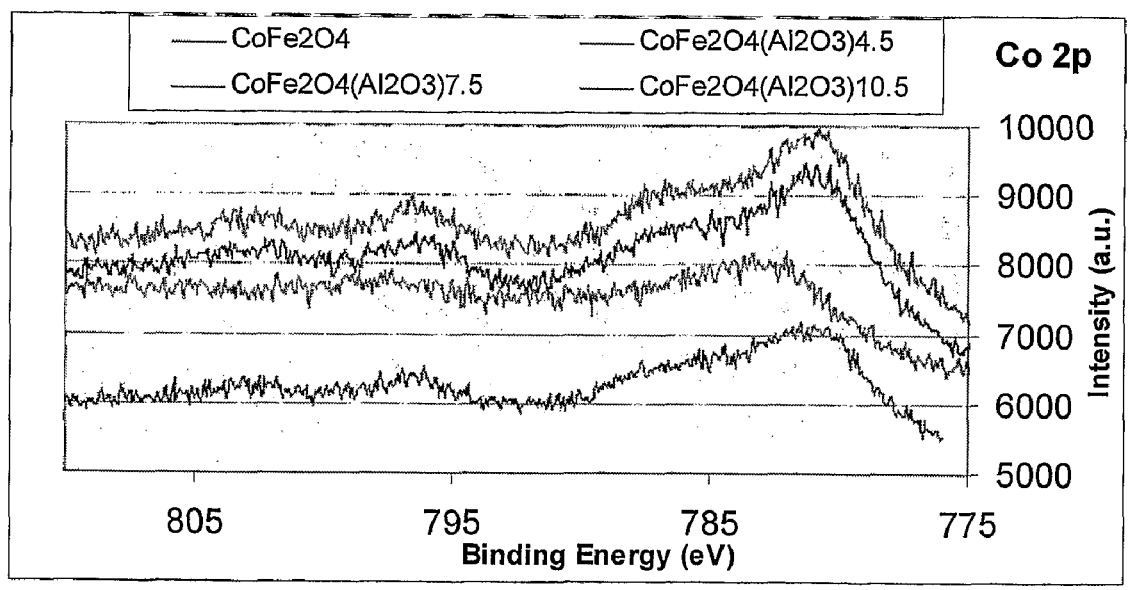
FIG. 8 represents the X-ray photoelectron spectroscopy (XPS) results corresponding to the Co2P energy level of $CoFe_2O_4(Al_2O_3)_{4.5}$, $CoFe_2O_4(Al_2O_3)_{7.5}$, $CoFe_2O_4(Al_2O_3)_{10.5}$ catalysts and the $CoFe_2O_4$ model compound.
Figure 9:
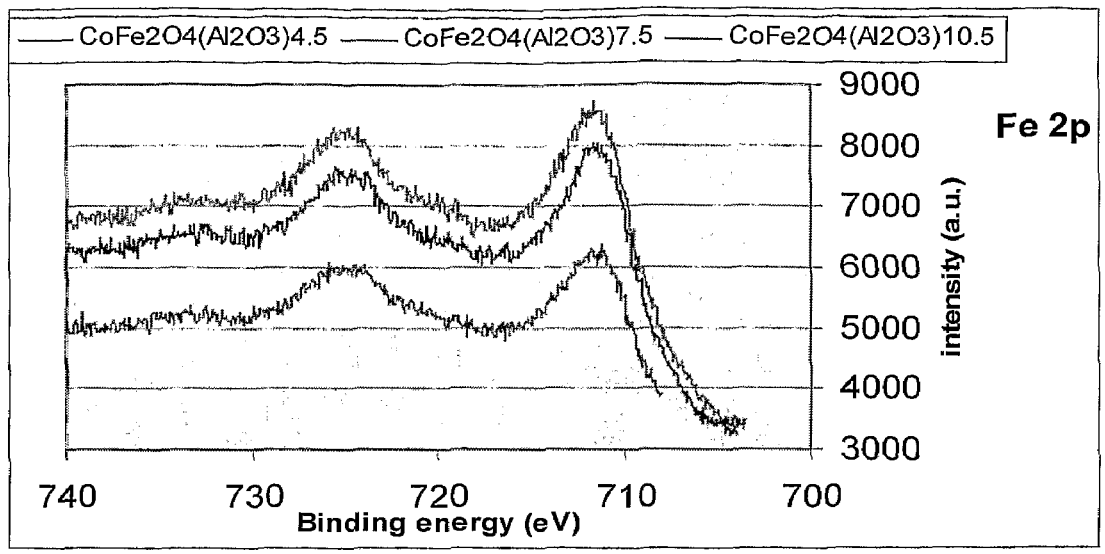
FIG. 9 represents the X-ray photoelectron spectroscopy (XPS) results corresponding to the Fe2P energy level of $CoFe_2O_4(Al_2O_3)_{4.5}$, $CoFe_2O_4(Al_2O_3)_{7.5}$, $CoFe_2O_4(Al_2O_3)_{10.5}$ catalysts.
Figure 10:
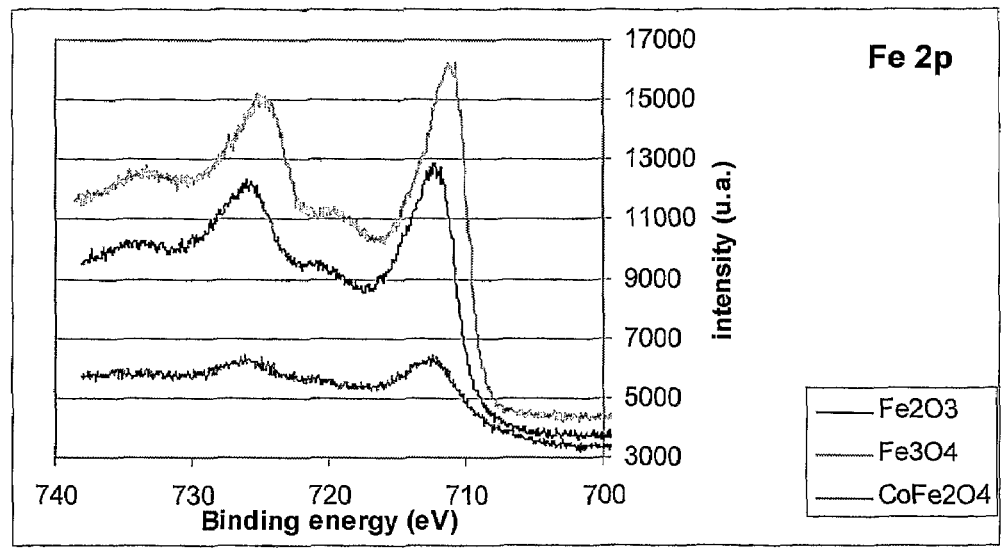
FIG. 10 represents the X-ray photoelectron spectroscopy (XPS) results corresponding to the Fe2P energy level of $Fe_2O_3$, $Fe_3O_4$ the $CoFe_2O_4$ model compounds.

Transmission electron microscopy images of multi-walled carbon nanotube synthesised on the $CoFe_2O_4(Al_2O_3)_w$ catalyst after 20 minutes and 60 minutes of reaction are shown in FIG. 6.

Example 8

In order to characterise the Co and Fe phases present in the $CoFe_2O_z(Al_2O_3)_w$ catalysts, X-ray photoelectron spectroscopy analysis were carried out on $CoFe_2O_4(Al_2O_3)_{4.5}$, $CoFe_2O_4(Al_2O_3)_{7.5}$, $CoFe_2O_4(Al_2O_3)_{10.5}$ and on $Co_3O_4$, $Fe_2O_3$ and $CoFe_2O_4$ model compounds. These results are shown is FIGS. 7-10, respectively. From these figures, it is clear that the peak position and the shape of the XPS signals are similar for the three $CoFe_2O_z(Al_2O_3)_w$ catalyst compositions. They also correspond to the $CoFe_2O_4$ model compound, which is in agreement with the XRD results showed in FIG. 2-4.

Example 9

Figure 11:
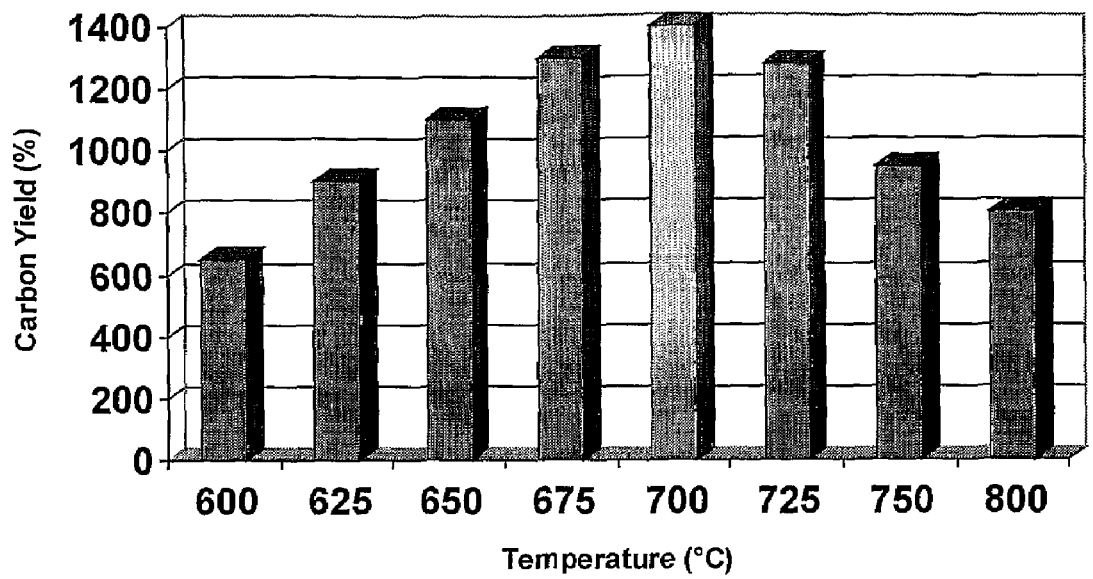
FIG. 11 represents the effect of the reaction temperature on the carbon yield.
Figure 12:
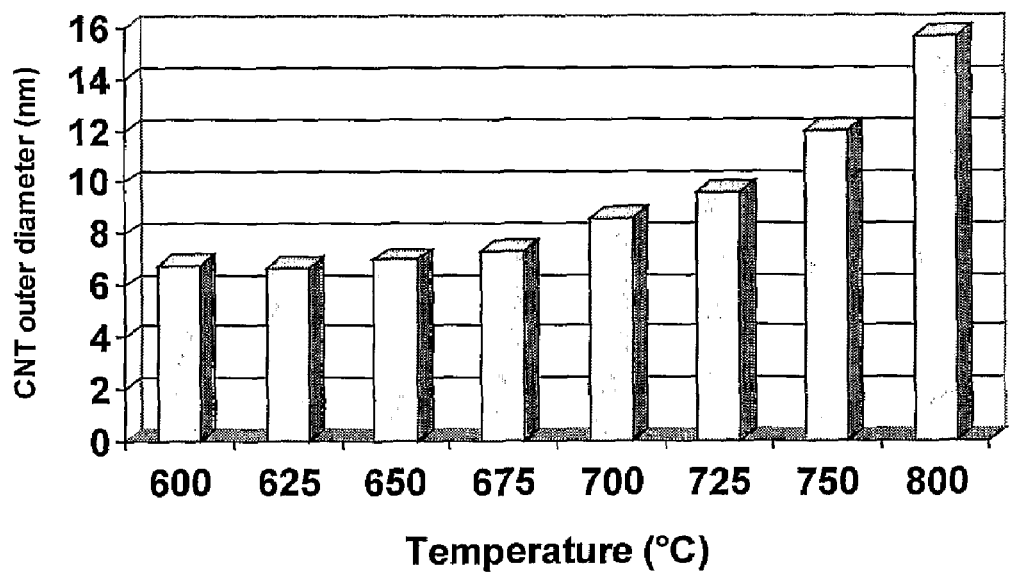
FIG. 12 represents the effect of the reaction temperature on the carbon nanotube outer diameter.

We investigated the effect of the reaction temperature (600-800° C. temperature range) on the carbon nanotube yield and outer diameter using the $CoFe_2O_4(Al_2O_3)_{32}$ catalyst formulation. The results of these experiments are shown in FIGS. 11 and 12, respectively. Optimal carbon yield is obtained at 700° C. (1400%). Under this reaction condition, the CNT diameter is about 9 nm. Very thin multi-wall CNT having outer diameter between 6-7 nm are produced at reactions temperatures between 650-675° C. At T>700° C., the CNT diameter increases while the CNT yield decreases continuously due to the sintering of both the active phase and catalyst support.

The invention claimed is:

1. A catalyst system for the selective conversion of hydrocarbons into multi-walled carbon nanotubes and hydrogen, said catalyst comprising a compound of the formula:

$$CoFe_2O_4(Al_2O_3)_w$$

wherein $1.5 \leq w \leq 16$.

2. The catalyst system of claim 1, wherein the compound is $CoFe_2O_4(Al_2O_3)_{4.5}$.

3. The catalyst system of claim 2 wherein the compound is obtained by a thermal treatment of a hydroxide precursor of the formula (1)

$$CoFe_2(OH)_8 (Al(OH)_3)_q$$

wherein $3 \leq q \leq 32$.

4. The catalyst system of claim 1, wherein the compound is $CoFe_2O_4(Al_2O_3)_{16}$.

5. The catalyst system of claim 4 wherein the compound is obtained by a thermal treatment of a hydroxide precursor of the formula (1)

$$CoFe_2(OH)_8(Al(OH)_3)_q$$

wherein $3 \leq q \leq 32$.

6. The catalyst system of claim 1 wherein the compound is obtained by a thermal treatment of a hydroxide precursor of the formula (1)

$$CoFe_2(OH)_8(Al(OH)_3)_q$$

wherein $3 \leq q \leq 32$.

7. The catalyst system of claim 6, wherein said hydroxide precursor is a hydroxide precursor of the formula:

$$CoFe_2(OH)_8(Al(OH)_3)_9.$$

8. The catalyst system of claim 6, wherein said hydroxide precursor is a hydroxide precursor of the formula:

$$CoFe_2(OH)_8(Al(OH)_3)_{32}.$$

9. A process for synthesizing the hydroxide precursor of claim 6, wherein a reaction between cobalt, iron and aluminum compounds is carried out according to a process selected from the group consisting of impregnation, co-precipitation, sol-gel and citrate complexation.

10. The process of claim 9 comprising the step of impregnation of an aluminum hydroxide with metallic solutions containing soluble salts of Co and Fe.

11. The process of claim 10, wherein said impregnation is a simultaneous impregnation.

12. The process of claim 9, wherein the aluminum hydroxide from the formula (1) is obtained by a calcination of said aluminum hydroxide at $T \geq 350°$ C. for 0.5 to 4 hours.

13. The process of claim 9, wherein said metallic solution comprises cobalt acetate or cobalt nitrate, iron acetate or iron nitrate.

14. The process of claim 9, wherein cobalt acetate is selected for Co/(Co+Fe) ratios between 0.30-0.40 and cobalt nitrate is selected for the Co/(Co+Fe) ratios between 0.30-0.75.

15. The process for synthesising the hydroxide precursor catalyst of claim 6 comprising the step of co-precipitation of an aluminum hydroxide with metallic solutions containing soluble salts of Co and Fe.

16. The process of claim 15, comprising the additional step of drying the impregnated or co-precipitation mixed hydroxide at temperatures between 60° C.-120° C. for 1 to 4 hours.

17. The process of claim 16, additionally comprising the step of calcinating the impregnated or co-precipitation mixed hydroxide.

18. The process of claim 17, wherein the calcination comprises two steps, a first step comprising heating in a flow of nitrogen at a temperature ranging from 120° C. to 350° C. at a rate of heat between 5° C. to 20° C. per minute and remaining isothermally at the same conditions between 0.5 to 4 hours, and a second step comprising a heating in a flow of nitrogen between 450° C. to 700° C. at a rate of heat between 5° C. to 20° C. per minute, and remaining isothermally between 0.5 to 2 hours.

19. The process of claim 17, wherein the first step comprises heating in a flow of nitrogen at a temperature ranging from 120° C. to 350° C. at a rate of heat between 5° C. to 20° C. per minute and remaining isothermally at the same conditions between 1 to 2 hours and the second step comprising a heating in a flow of nitrogen between 500° C. to 600° C. at a rate of heat between 5° C. to 20° C. per minute, and remaining isothermally between 0.5 to 2 hours.

20. A process for the selective conversion of hydrocarbons and the extraction of multi-walled carbon nanotubes and hydrogen comprising the steps of:
providing a catalyst precursor according to claim 16;
activating said catalyst precursor by drying and/or calcination;
contacting the activated catalyst precursor with a carbon source under multi-walled carbon nanotube production conditions defined by the reaction temperature and the reaction space time (W/F); and
extracting the multi walled nanotubes.

21. The process of claim 20, wherein the carbon source is an olefin, an alkane or a mixture thereof.

22. The process of claim 20, wherein the olefin is ethylene and/or propylene.

23. The process of claim 22, wherein the reaction space time (W/F) of the ethylene is comprised between 0.30 g.h/mole and 0.45 g.h/mole.

24. The process of claim 20, wherein the alkane is methane and/or ethane.

25. The process of claim 24, wherein the reaction space time (W/F) of the methane is between 0.20 g.h/mole and 0.45 g.h/mole.

26. The process of claim 20, wherein the alkane mixture is natural gas.

27. The process of claim 20, wherein the reaction temperature is between 600° C. and 1100° C.

28. The process of claim 20, wherein the reaction temperature is between 650° C. and 950° C.

29. The process of claim 20, wherein the reaction space time (W/F) of the hydrocarbon is between 0.20 g.h/mole and 0.75 g.h/mole.

30. The process of claim 20, wherein the selective conversion of hydrocarbons into multi-walled carbon nanotubes and hydrogen is performed according to a thin film catalyzed bed process, a moving bed process or a rotary kiln process.

* * * * *